United States Patent [19]

Hauschild et al.

[11] 4,167,406

[45] Sep. 11, 1979

[54] HIGH TEMPERATURE DECOMPOSITION PROCESS FOR PRODUCING AN ALKALI-CONTAINING CALCINED PHOSPHATE FERTILIZER

[75] Inventors: Ulrich Hauschild, Hanover; Hans-Heinz Kaspers, Grossburgwedel ot Engensen; Heinrich Rötger, Gehrden, all of Fed. Rep. of Germany

[73] Assignee: Kali-Chemie Aktiengesellschaft, Hanover, Fed. Rep. of Germany

[21] Appl. No.: 882,268

[22] Filed: Feb. 28, 1978

[30] Foreign Application Priority Data

Mar. 2, 1977 [DE] Fed. Rep. of Germany ....... 2709016

[51] Int. Cl.$^2$ .................... C05B 11/10; C05B 13/02
[52] U.S. Cl. ............................................ 71/45; 71/41; 423/167; 423/313
[58] Field of Search ............... 71/45, 47, 42, 32, 34, 71/43, 52, 53, 37, 41; 423/307, 308, 309, 311, 312, 313, 167

[56] References Cited

U.S. PATENT DOCUMENTS

| | | | |
|---|---|---|---|
| 1,799,882 | 4/1931 | Brenek | 71/45 |
| 2,337,498 | 12/1943 | Ritter et al. | 71/41 |
| 3,713,803 | 1/1973 | Holst et al. | 71/47 X |
| 3,802,861 | 4/1974 | Holst et al. | 71/47 X |
| 3,985,537 | 10/1976 | Hauschild et al. | 71/47 X |

FOREIGN PATENT DOCUMENTS

| | | |
|---|---|---|
| 729909 | 1/1943 | Fed. Rep. of Germany . |
| 2262818 | 7/1974 | Fed. Rep. of Germany ............. 71/45 |

*Primary Examiner*—Kenneth M. Schor
*Attorney, Agent, or Firm*—Schwartz, Jeffery, Schwaab, Mack, Blumenthal & Koch

[57] ABSTRACT

An alkaline high temperature process for the production of alkali containing highly citrate soluble calcined phosphate fertilizer is disclosed. The process comprises calcining a preheated mixture comprising a crude phosphate, an alkaline decomposing agent, silicic acid and phosphoric acid in a rotary kiln at a temperature of between about 900° and 1300° C. The preheated mixture is prepared by introducing phosphoric acid directly into the kiln and therein contacting it with the hot precursory mixture of the remaining starting material having a temperature of between about 150° to 900° C. The amounts of starting materials are preferably chosen such that in the mixture 1 mole of $P_2O_5$ is present per about 1.1 to 1.8 moles of alkali oxide, and about 0.5 moles of $SiO_2$ are present per mole of CaO which is in excess of the amount of CaO which can be bound in the form of calcium alkali phosphate.

6 Claims, No Drawings

HIGH TEMPERATURE DECOMPOSITION PROCESS FOR PRODUCING AN ALKALI-CONTAINING CALCINED PHOSPHATE FERTILIZER

BACKGROUND OF THE INVENTION

The preparation of phosphate fertilizers by means of alkaline high temperature decomposition of naturally occurring calcium phosphates is well known in the art. For example, according to the German Patent No. 481,177, alkali carbonate and silicic acid are used as decomposing agents, and this mixture of natural crude phosphates, alkali carbonate and silicic acid is heated to a calcining temperature of above 1100° C. in a rotary kiln. During such a process, the formation of alkali calcium phosphate from tricalcium phosphate is presumably taking place in a reaction represented by the following empirical equation:

$$2Ca_3(PO_4)_2 + SiO_2 + 2Na_2CO_3 \rightarrow 2(Na_2O \cdot 2CaO \cdot P_2O_5) + 2CaO \cdot SiO_2 + 2CO_2$$

According to this equation, at least 1 mole of $Na_2O$ is present per 1 mole of $P_2O_5$, and the added amount of $SiO_2$ is adjusted so that the CaO which is not bound to the $P_2O_5$ in a molar ratio of 2:1 is transformed into calcium orthosilicate.

Later it has been found that it is advantageous if the molar ratio $Na_2O/P_2O_5$ is between 1.1:1 and 1.8:1 and the decomposition is effected in the presence of water vapor which can be provided by using fuels, in particular fuel oils, which are rich in hydrogen.

The phosphate component of the calcium-sodium-silicophosphate which has been industrially produced in this manner for more than 50 years is plant-available on practically all types of cultivated soils and exhibits a high $P_2O_5$ solubility in standard test solutions, e.g. in a test solution according to Petermann, in a neutral solution of ammonium citrate, and in a 2% citric acid solution.

More recently, in addition to soda, aqueous solutions of alkali hydroxides have also been used industrially as decomposition agents, as is disclosed in German Pat. No. 1,592,690 and No. 2,128,133 and the corresponding U.S. Pat. Nos. 3,713,803 and 3,985,537. By using a potassium hydroxide solution, potassium containing calcined phosphate fertilizers can be obtained. The latter which contain about 50% of $P_2O_5 + K_2O$ are valuable multi-nutrient fertilizers.

Depending on the type of the naturally occurring raw phosphates and the alkali compounds which are used, the phosphates which can be produced in a calcination process exhibit a $P_2O_5$ content of from about 20 to about 30%.

However, over the course of time, consumers have come to desire an increasingly higher nutrient content in a calcined phosphate product obtained with the aid of soda or a sodium hydroxide solution. Therefore, only calcined phosphates including a high percentage of $P_2O_5$ can be sold any more. Since, on the one hand, high percentage types of raw phosphates are becoming less and less available for producing a phosphate product of a constant composition, containing for example more than 29% of $P_2O_5$, and on the other hand, raw phosphates including a lower percentage of $P_2O_5$ are available at low costs throughout the world, the problem of how to concentrate the calcined phosphates directly or indirectly in an economical procedure has been present for many years already. In spite of continuous efforts, no satisfying solution of this problem has been found so far.

In all processes which so far have been proposed for directly increasing the $P_2O_5$ content in phosphate fertilizers, the additional $P_2O_5$ is provided by adding alkali phosphates to the raw phosphate prior to introducing the mixture into the rotary kiln. Further to the usually coarse grained crystalline orthophosphates, less exactly defined alkali phosphates are also used which have been prepared from phosphoric acid and alkali metal compounds shortly before their use.

Thus, German Pat. No. 681,699 discloses the preparation of alkali-calcium phosphates wherein the $P_2O_5$ content is above 38% by calcining raw mineral phosphates together with trialkali orthophosphates at about 1000°–1100° C. The added amount of trialkali orthophosphate is preferably such that about 0.8 moles of $P_2O_5$ are provided by the latter per mole of $P_2O_5$ in the raw mineral phosphates. In this patent it is also mentioned that, instead of the trialkali orthophosphate, mixtures of salts which are chemical precursors of this orthophosphate salt can be used; for example, mixtures of sodium metaphosphate and soda, of monosodium orthophosphate and soda, or of sodium pyrophosphate and soda. Furthermore, German Pat. No. 721,412 discloses a process for preparing phosphate fertilizers wherein the raw phosphate is mixed with such an amount of dialkali phosphates, e.g., disodium phosphate, which provides 0.8 to 1.5 moles of $P_2O_5$ per 1 mole of $P_2O_5$ in the raw phosphate, and wherein calcining temperatures up to about 1150° C. are used. The addition of such solid alkali phosphates has the disadvantage that these processes cannot be carried out in a rotary kiln on an industrial scale. Deposits on the wall of the kiln immediately occur after introducing the mixture into the rotary kiln. Such deposits can lead to a plugging of the kiln and can cause the formation of products of varying compositions.

It has further been attempted to avoid the use of valuable solid alkali phosphates by adding the necessary amounts of aqueous phosphoric acid and soda to the raw phoshpate prior to the introduction into the kiln (see, e.g., German Pat. No. 729,909). Yet hereby also, similar difficulties as with the use of solid alkali phosphates are encountered in practice.

Repeated disturbances which can vary from short interruptions to a complete standstill of kiln operation affect the calcining process in the rotary kiln. Furthermore, the $P_2O_5$ solubility of the resulting reaction products in the Petermann test solution is inconsistent. These differences in solubility can be very high.

According to other recent proposals, the addition of silicic acid can be omitted completely or partly, if a correspondingly increased amount of phosphoric acid is added. The molar ratio $P_2O_5/CaO/K_2O$ within the mixture which is to be calcined should preferably be about 1:2–3:1.3–1.7 whereby the amount of $P_2O_5$ which is derived from the added phosphoric acid can comprise between 0.2 and 1.6 moles per mole of $P_2O_5$ from the phosphate mineral.

For preparing the mixture which is to be calcined, the crude phosphate is mixed with phosphoric acid and potassium hydroxide in such a way that potassium orthophosphate can be formed from the latter two components prior to introducing the mixture into the rotary kiln. In this procedure also, the above described difficulties occur during the passing of the mixture through the kiln. Even if the mixture is additionally granulated, these difficulties cannot completely be overcome. Therefore, it has already been proposed to use a tunnel furnace instead of a rotary kiln for the calcination process. Yet this would mean giving up all the technical advantages which are connected with carrying out the reaction in a rotary kiln.

SUMMARY OF THE INVENTION

It is an object of the present invention to provide an alkaline high temperature decomposition process for preparing an alkali-calcium-phosphate fertilizer wherein the $P_2O_5$ content of the crude mineral phosphate starting material is supplemented by $P_2O_5$ from added phosphoric acid, which avoids the disadvantages of the prior art processes for preparing $P_2O_5$ enriched phosphate fertilizers.

It is a further object of the present invention to provide such a process which can readily and continuously be carried out in a rotary kiln, and wherein the formation of deposits on the kiln walls is avoided.

It is a further object of the present invention to provide such a process, which yields an alkali-calcium phosphate product with a consistently high $P_2O_5$ content which exhibits a consistently high $P_2O_5$ solubility.

In order to accomplish the foregoing objects according to the present invention, there is provided an alkaline high temperature decomposition process for producing a calcined alkali-calcium phosphate fertilizing agent which comprises the steps of:

a. preparing a precursory mixture comprising a calcium phosphate, an alkaline agent selected from the group consisting of alkali carbonates, alkali hydroxides, and mixtures thereof, and silicic acid;

b. introducing the precursory mixture into a rotary kiln at its inlet;

c. preheating the precursory mixture by passing it through a preheating zone of the rotary kiln;

d. introducing phosphoric acid directly into the preheating zone of the rotary kiln;

e. mixing the preheated precursory mixture with the aqueous phosphoric acid solution in sufficiently finely divided form to obtain a complete mixture in a section of the preheating zone where the precursory mixture has reached a sufficiently high temperature to cause a rapid vaporization of free and of chemically bound water in the phosphoric acid;

f. passing the preheated complete mixture into a calcining zone of the rotary kiln;

g. calcining the preheated mixture in the calcining zone at a temperature of from about 900° to about 1300° C.; and h. recovering the calcined mixture at a discharge outlet of the rotary kiln.

Preferably, the amounts of starting materials are chosen such that, in the mixture which is to be calcined, the ratio between the calcium phosphate, the alkaline agent, and the phosphoric acid is equivalent to a ratio of 1 mole of $P_2O_5$ per about 1.1 to 1.8 moles of alkali oxide, and $SiO_2$ is present in an amount which is required to combine as calcium orthosilicate with the CaO exceeding the molar ratio 2 CaO:1 $P_2O_5$. When the precursory mixture is contacted with the phosphoric acid, its temperature suitably is between about 150° and about 900° C., preferably above 400° C.

If at least part of the decomposing agent is comprised of an alkali hydroxide, the latter may be applied in the form of an aqueous alkali hydroxide solution, at least part of which may be introduced directly into the rotary kiln, optionally simultaneously with the phosphoric acid.

The process according to the present invention is especially suited for preparing a calcined alkali-calcium phosphate fertilizer in continuous procedure in an industrial rotary kiln.

Further objects, features and advantages of the invention will become apparent from the detailed description of the invention and its preferred embodiments which follows.

DETAILED DESCRIPTION OF THE PREFERRED EMBODIMENTS

It has been found that the difficulties which are encountered in the prior art process for preparing a $P_2O_5$-enriched calcined phosphate fertilizer in a rotary kiln can be avoided, if the additional $P_2O_5$ is introduced into the kiln in the form of phosphoric acid. According to the present invention, the calcined alkali-calcium phosphate is prepared in a process which comprises calcining a mixture of a crude phosphate, alkali carbonate and/or hydroxide, silicic acid, and phosphoric acid in a rotary kiln at a temperature of from about 900° and about 1300° C. and wherein the phosporic acid is introduced directly into the rotary kiln and is added in sufficiently finely distributed form to the preheated hot-to-glowing hot mixture of the other components so that a rapid vaporization of the free and the chemically bound water takes place, and subsequently the decomposition of the material is completed.

The process according to the present invention is particularly suited for producing calcined phosphate fertilizer in a rotary kiln which is heated by a direct flame burner in the region of its discharge outlet. Because of the rotating movement in such a rotary kiln which is described and shown in the U.S. Pat. No. 3,985,537, the disclosure of which is hereby incorporated by reference, the mixture is caused to continuously flow from the inlet of the kiln toward the hot combustion gases, thereby passing from the preheating zone to the calcining zone and finally to the discharge outlet of the kiln. The temperature of the mixture is gradually increased during its passage through the kiln by means of the burner and the flue gases from the burner which are passing through the kiln countercurrently to the mixture.

Surprisingly, it has been found that, if the above-defined process conditions are observed, the phosphoric acid can be directly introduced into the rotary kiln, without encountering any substantial lumping of the mixture which is to be calcined or any disturbing deposit formation on the kiln walls. Thus, a uniform decomposition can be achieved without difficulties, yielding a calcined product which exhibits a high $P_2O_5$ solubility in a test solution according to Petermann or in a citric acid solution. For example, calcined products wherein $P_2O_5$ solubility is above 99.5% can easily be achieved.

The term "phosphoric acid" as it is used in the present specification and claims is meant to denote phosphoric acids and aqueous solutions thereof, containing chemically bound and/or free water, wherein the $P_2O_5$ content is at least 10% by weight. Within this range, the concentration of the phorphoric acid is not critical.

Preferably a technical grade phosphoric acid is used which exhibits a $P_2O_5$ content of from about 45 to about 55% by weight (corresponding to from about 60 to about 75% $H_3PO_4$). It is important that the phosphoric acid is contacted with the precursory mixture of the remaining starting materials in the rotary kiln in such a manner that the water which is introduced with the phosphoric acid is rapidly evaporated and the materials are homogenously mixed. Therefore, the phosphoric acid has to be applied to the heated precursory mixture in sufficiently finely distributed form. In this regard, the required degree of distribution essentially depends on the temperature which the precursory mixture has reached in the rotary kiln. The phosphoric acid may be added from the inlet side of the rotary kiln and/or from its outlet side. The manner of introducing the phosphoric acid may be selected as desired. For example, the methods for introducing an alkali hydroxide solution which are described in the U.S. Pat. No. 3,985,537, the disclosure of which is hereby incorporated by referendce, are also suitable for introducing the phosphoric acid.

It has been found that it is advantageous if the temperature of the precursory mixture is at least 150° C. when the phosphoric acid is added. If the temperature is below this limit, lump formation may readily occur, even if the phosphoric acid is introduced extremely carefully, and thus a uniform decomposition is not guaranteed. Furthermore, it is evident that the phosphoric acid has to be intermixed with the other starting materials before the mixture reaches the actual sinter zone, because the desired complete homogenization of the mixture has to be achieved at least during the last portion of the passage through the kiln. Therefore, within the conventional calcining process in a rotary kiln, wherein usually maximum temperatures of from about 1100° C. to 1300° C. are applied, the temperatures of the precursory material at the time of contact with the phosphoric acid advantageously is not higher than about 1000° C. Within the above-mentioned temperature range of the precursory mixture, the speed of the water evaporation and the chemical reaction are increased at higher temperatures. Threfore it is apparent that medium or higher temperatures of the precursory mixture at the time of contact with the phosphoric acid provide proper decomposition of the crude phosphate.

The amount of the added phosphoric acid, the concentration of which may be selected as desired, depends on the desired composition of the final product and the type of available starting materials. For example, if a calcined phosphate having a citrate-soluble $P_2O_5$ content of 30% is to be prepared using soda as a decomposing agent, substantially more phosphoric acid is needed if the crude phosphate has a $P_2O_5$ content of 32% than if the crude phosphate has a $P_2O_5$ content of 38%. If an aqueous potassium hydroxide solution is used as an alkaline decomposing agent, this also requires a higher amount of phosphoric acid per crude phosphate than the amount which is required for obtaining calcined products of an equally high $P_2O_5$ content but using soda or an aqueous sodium hydroxide solution as a decomposing agent.

By the same measure as free phosphoric acid is added to the mixture which is to be calcined, the amount of silicic acid which otherwise is necessary for binding the free CaO in the form of calcium orthosilicate must be reduced. The amount of silicic acid should be sufficient to react all the CaO which is in excess of the amount which is equivalent to the empirical formula $CaMePO_4$ should be able to be bound in the form of ortho silicate. Theoretically, however, there is no reason for restricting the added amount of phosphoric acid to less than the amount which would be needed to transform the entire amount of CaO and alkali oxide in the mixture into soluble phosphates. Ignoring any $SiO_2$ content in the crude phosphate, the composition of the obtainable products may be equivalent to a molar ratio of CaO:$Me_2O$:$P_2O_5$ of about 2:1:1, about 2:>1:1 or about 2:>1:>1.

Alkali carbonates and/or aqueous solutions of alkali hydroxides may be used as alkaline decomposing agents. They are conventionally added to the crude phosphate prior to introducing it into the kiln. In the event that an alkali hydroxide solution is used, it is also possible to introduce at least a portion thereof directly into the rotary kiln. In this manner, the phosphoric acid and the alkali hydroxide solution can be simultaneously reacted with the preheated mixture of the remaining materials. This procedure does not cause any complication during passage of the material through the kiln.

In the case of the above-defined preferred ratio of the starting materials, which is equivalent to a molar ratio of alkali-oxide:$P_2O_5$ of about 1.1 to about 1.8:1 and a molar ratio of CaO:$P_2O_5$ of at least about 2:1, the $P_2O_5$ content of the final calcined product is in the form of orthophosphates. Only in the event of an intermediary inhomogenity in the mixture or in the event that a very high amount of phosphoric acid is added, part of the $P_2O_5$ content may be in the form of pyro- and possibly metaphosphates. The orthophosphates nearly always exhibit a very high $P_2O_5$ solubility (above 98%) in a test solution according to Petermann, in a N-citrate solution, and in a citric acid solution. The resulting calcined alkali calcium phosphates are phosphates of the type "Rhenania" and are known to be valuable fertilizing agents. The ground products can readily be granulated, either alone or in combination with other nutrient agents, e.g. potassium salts.

Several embodiments of the present invention wil now be further explained in the following non-limitive examples.

EXAMPLE 1

A mixture of 1000 parts by weight of a West African crude phosphate (36% $P_2O_5$, 51% CaO and 4.5% $SiO_2$, 427 parts by weight of soda (100% $Na_2CO_3$), 59 parts by weight of sand ($SiO_2$) and recycled dust from the kiln waste gases are continuously introduced into an industrial rotary kiln. The rotary kiln is directly heated by means of an inside oil burner and operates according to the countercurrent principle; that is, the mixture which is to be calcined travels toward the hot combustion gases. In the section of the kiln where the mixture has reached a temperature of between about 700° and about 900° C., an amount of 80 kg of a technical grade wet phosphoric acid ($P_2O_5$ content=50% by weight) per 1000 kg of the crude phosphate is continuously added to the mixture in finely divided form. No occurence of deposit on the walls is observed. Also, no difficulties are encountered during the passage through the actual calcining zone at a maximum temperature of 1220° C. The resulting calcined product has a $P_2O_5$ content of 31.4%, the $P_2O_5$ solubility is 98.8% in a test solution according to Petermann and 99.6% in a 2% citric acid solution. A constant $P_2O_5$ solubility is found in the various analyzed samples. This clearly proves the advantage which results from adding the phosphoric acid in the manner according to the present invention.

COMPARATIVE EXAMPLE 1a

According to the prior art procedures, prior to introducing the mixture into the kiln, an amount of 80 kg of a technical grade wet phosphoric acid ($P_2O_5$ content=50% (0 by weight) per 1000 kg of the crude phosphate is continuously added in finely divided form to a mixture of 1000 parts by weight of a West African crude phosphate (36% $P_2O_5$, 51% CaO and 4.5% $SiO_2$), 427 parts by weight of soda (100% $Na_2CO_3$), 59 parts by weight of sand ($SiO_2$) and recycled dust from the kiln waste gases in a mixer (paddle screw mixer). Thereby a corresponding amount of sodium orthophosphate hydrate is formed. The mixture is then continuously introduced into the rotary kiln which is directly heated by means of an inside oil burner and wherein it continuously travels towards the hot combustion gases and thereby is heated to a maximum calcining temperature of about 1220° C. Further to repeated disturbances which occur in the mixer, deposits on the walls of the kiln occurred shortly after introducing the mixture into the kiln. These deposits adversely affect the operation of the kiln and even lead to a stillstand of the calcining operation. The resulting product exhibits a $P_2O_5$ content of about 31.4%. Due to the disturbances in the production, the $P_2O_5$ solubility of various samples in the Petermann test solution is inconsistent and varies from 85 to 98%.

EXAMPLE 2

1000 parts by weight of cola apatite (39.1% $P_2O_5$, 51% CaO, 1.6% $SiO_2$) and the dust which has been collected in a conventional separater from the kiln waste gases are continuously introduced into an industrial directly heated rotary kiln as is described in example 1. From the burner side, an aqueous solution containing 49.1% by weight of potassium hydroxide and a wet technical grade phosphoric acid having a $P_2O_5$ content of 54.7% by weight are continuously and simultaneously added in finely divided form in counterdirection to the forthcoming apatite mixture in such a way that they come into contact with the apatite mixture when the latter has reached a temperature in the range of from about 600° C. to 850° C. The added amounts of potassium hydroxide solution corresponds to a by weight ratio of 1 part of apatite per 1.168 parts of potassium hydroxide. The added amount of phosphoric acid corresponds to a by weight ratio of 1 part of apatite per 0.482 parts of phosphoric acid.

After calcining the mixture at a maximum of 1140° C., the resulting calcined potassium-calcium phosphate has a $P_2O_5$ content 37.1% and a $K_2O$ content of 27.2%. The $P_2O_5$ solubility of the easily grindable product is 99.8% in the test solution according to Petermann, and 99.8% in a 2% citric acid solution. Only a small part of the total $K_2O$ content is soluble in water.

Even though not only the aqueous potassium hydroxide solution which serves as a decomposing agent but also the aqueous phosphoric acid are introduced directly into the rotary kiln, a consistently well decomposed calcined phosphate is obtained.

Contrary to this, in an attempt to mix the technical grade phosphoric acid with the dry materials prior to introducing the materials into the kiln, considerable difficulties are immediately encountered. On the one hand, difficulties occurr in the charging means and on the other hand, due to deposit formation at the walls, the rotary kiln is clogged.

EXAMPLE 3

Analagously to the procedure described in Example 1, 1000 parts by weight of a Florida pebble-phosphate (31.4% $P_2O_5$, 47.6% CaO and 9.0% $SiO_2$), 171 parts by weight of an aqueous solution containing 49.8% of sodium hydroxide and recycled dust are mixed in paddle screw mixer, while passing the waste gases from the over therethrough, whereby the sodium hydroxide solution is partially concentrated and carbonated. The resulting crumbly material is continuously introduced into the industrial rotary kiln. From the inlet side of the kiln and in counterdirection to the flow of the waste gases in the kiln, technical grade aqueous phosphoric acid having a $P_2O_5$ content of 50% is continuously added in finely divided form to the material which has reached a temperature of from about 150° to 450° C. in an amount corresponding to 151 kg of phosphoric acid per 1000 kg of crude phosphate. Simultaneously an amount of 468 kg of an aqueous solution containing 49.8% by weight of sodium hydroxide per 1000 kg of the crude phosphate is introduced into the rotary kiln from the burner side in such a way that it comes into contact with the heated mixture when the latter has reached a temperature of from about 700 to about 850° C.

Due to the fact that the aqueous solutions of the sodium hydroxide and the phosphoric acid are introduced in finely divided form, after calcining the mixture at a maximum of 1230° C., an easily grindable product can be obtained wherein the $P_2O_5$ content is 31.3% and the $P_2O_5$ solubility is 98.9% in the test solution according to Petermann and 99.4% in a 2% citric acid solution.

Contrary to this, and similarly as described in the foregoing example, adding the phosphoric acid to the mixture prior to introducing it into the kiln adversely affects the process. In particular in the inlet region, the crumbly material forms a large deposit, which leads to a clogging of the kiln and thus to a standstill of the kiln.

EXAMPLE 4

A mixture containing 1000 parts by weight of a crude phosphate from North Africa having a $P_2O_5$ content of 32.1%, a CaO content of 50% and a $SiO_2$ content of 2.2%, 541 parts by weight of soda and 30 parts by weight of sand is continuously introduced into the industrial kiln together with the recycled dust from the kiln waste gases.

When the mixture has reached a temperature of from about 400° to about 600° C., an amount of 345 parts by weight of a technical grade phosphoric acid having a $P_2O_5$ content of 54.7% by weight per 1000 parts by weight of the crude phosphate is added to the mixture in finely divided form. Thereby, no disturbances occur during the further passage of the material which is to be calcined through the kiln. After being calcined at a maximum of 1210° C., the resulting sintered alkali-calcium phosphate has a $P_2O_5$ content of 34.7%, and the $P_2O_5$ solubility is 98.8% in the Petermann test solution and 99.6% in the citric acid solution. Similarly to example 3, a uniformly decomposed product is also obtained in this example.

What is claimed is:

1. An alkaline high temperature decomposition process for producing a calcined alkali calcium phosphate fertilizing agent in a rotary kiln which kiln comprises an inlet for solid material and discharge outlet at its end opposite the inlet and which kiln is heated by means of a direct flame-burner situated inside the kiln in the region of its discharge outlet and wherein flue gases from the burner are passed first through a calcining zone and subsequently through a preheating zone of the kiln towards the region of the inlet, said process comprising the steps of (a) preparing a precursory mixture comprising a calcium phosphate; an alkaline agent selected from the group consisting of alkali-carbonates, alkali hydroxides and mixtures thereof; and silicic acid wherein when said alkaline agent is an alkali hydroxide it may be added directly into the rotary kiln prior to said preheating zone;

(b) introducing the precursory mixture into the rotary kiln at its inlet;

(c) progressively heating the precursory mixture up to a temperature of between about 900° and 1300° C. by continuously passing it through the kiln countercurrently to the flow of the flue gases from the kiln inlet through the preheating zone and subsequently through the calcining zone towards the discharge outlet;

(d) introducing an aqueous solution of phosphoric acid directly into the preheating zone;

(e) mixing the aqueous phosphoric acid solution in sufficiently finely divided form with the heated precursory mixture in a section of the preheating zone wherein the precursory mixture has been heated to a temperature of between about 150° and 900° C. which is sufficiently high to cause rapid vaporization of free and of chemically bound water in the phosphoric acid solution and at such a rate that a complete mixture is obtained wherein the ratio between the calcium phosphate, the alkaline agent and the phosphoric acid is equivalent to a ratio of 1 mole of $P_2O_5$ per about 1.1 to 1.8 moles of alkalioxide, and $SiO_2$ is present in the complete mixture in an amount which is sufficient to combine as calcium orthosilicate with the amount of CaO which exceeds the molar ratio 2 CaO:1 $P_2O_5$;

(f) passing the heated complete mixture into the calcining zone of the rotary kiln;

(g) calcining the preheated mixture in the calcining zone at a temperature of from about 900° to about 1300° C.; and (h) recovering the calcined mixture at the discharge outlet of the rotary kiln.

2. The process as defined in claim 1, wherein at least part of the alkaline agent is an alkali hydroxide.

3. The process as defined in claim 1, wherein the temperature of the precursory mixture in the mixing step(e) is from about 600° to about 900° C.

4. The process as defined in claim 1, wherein the temperature of the precursory mixture in the mixing step(e) is from about 150° to about 450° C.

5. The process as defined in claim 1, wherein the temperature of the precursory mixture in the mixing step(e) is from about 400° to about 600° C.

6. The process as defined in claim 1, wherein said alkaline agent comprises an alkali hydroxide solution and at least a portion of said solution is introduced directly into the rotary kiln prior to said preheating zone.

* * * * *